United States Patent
Nikolayev et al.

(10) Patent No.: US 9,477,941 B2
(45) Date of Patent: Oct. 25, 2016

(54) GENEALOGY SYSTEM FOR INTERFACING WITH SOCIAL NETWORKS

(75) Inventors: Ilya Nikolayev, New York, NY (US); Andrew Merkatz, New York, NY (US)

(73) Assignee: INTELIUS, INC., Bellevue, WA (US)

( * ) Notice: Subject to any disclaimer, the term of this patent is extended or adjusted under 35 U.S.C. 154(b) by 1236 days.

(21) Appl. No.: 12/145,068

(22) Filed: Jun. 24, 2008

(65) Prior Publication Data
US 2009/0319610 A1 Dec. 24, 2009

(51) Int. Cl.
*G06F 15/16* (2006.01)
*G06Q 10/10* (2012.01)

(52) U.S. Cl.
CPC ................... *G06Q 10/10* (2013.01)

(58) Field of Classification Search
USPC .................................. 709/204–207
See application file for complete search history.

(56) References Cited

U.S. PATENT DOCUMENTS

| | | | |
|---|---|---|---|
| 5,504,890 A * | 4/1996 | Sanford | |
| 6,760,731 B2 * | 7/2004 | Huff | |
| 6,857,877 B1 * | 2/2005 | Watanabe | 434/219 |
| 7,912,971 B1 * | 3/2011 | Dunn | 709/229 |
| 7,925,620 B1 * | 4/2011 | Yoon | 707/609 |
| 2005/0149522 A1 * | 7/2005 | Cookson et al. | 707/7 |
| 2005/0216300 A1 * | 9/2005 | Appelman et al. | 705/1 |
| 2006/0265283 A1 * | 11/2006 | Gorodyansky | 705/14 |
| 2007/0218429 A1 * | 9/2007 | Kolo et al. | 434/154 |
| 2007/0266003 A1 * | 11/2007 | Wong et al. | 707/3 |
| 2007/0276702 A1 * | 11/2007 | Dani | 705/3 |
| 2008/0033933 A1 * | 2/2008 | Cookson et al. | 707/5 |
| 2008/0075282 A1 * | 3/2008 | Watanabe et al. | 380/44 |
| 2008/0103784 A1 | 5/2008 | Wong et al. | |
| 2008/0108027 A1 * | 5/2008 | Sallin | 434/154 |
| 2008/0172407 A1 * | 7/2008 | Sacks | 707/102 |
| 2008/0208867 A1 * | 8/2008 | Poston et al. | 707/9 |
| 2008/0288886 A1 * | 11/2008 | Sherwood et al. | 715/772 |
| 2009/0064303 A1 * | 3/2009 | Dickinson et al. | 726/10 |
| 2009/0216749 A1 * | 8/2009 | Hardt | 707/5 |

* cited by examiner

*Primary Examiner* — Andrew Goldberg
(74) *Attorney, Agent, or Firm* — Jackson Walker LLP; Christopher J. Rourk (57) ABSTRACT

A system for managing genealogy data is provided. The system includes a genealogy application for storing genealogy account identification data for a first genealogy account. A social network interface receives data from the first genealogy account and provides genealogical data to the genealogy application. A relative invitation system generates an invitation to a user to create a second genealogy account for the genealogy application.

16 Claims, 5 Drawing Sheets

GENEALOGY SYSTEM FOR INTERFACING WITH SOCIAL NETWORKS

FIELD OF THE DISCLOSURE

This disclosure relates to systems for managing genealogy data, and more specifically to a genealogy system for interfacing with one or more social networks that allows a user to manage genealogy data using one or more social networks.

BACKGROUND OF THE INVENTION

Systems for managing genealogy data are known in the art. Such systems typically are dedicated systems that store genealogy data, and which do not provide much functionality for interfacing with other data systems. As a result, any data that is provided to those systems must be input from other sources manually, and those sources must be manually identified and searched. Accordingly, a user whose task is to compile a family tree must do so manually and is unable to leverage information that may exist outside of his/her chosen data system.

SUMMARY OF THE INVENTION

In accordance with the present invention, a genealogy system and method for interfacing with one or more social networks are provided that allows a user to manage genealogy data using one or more social networks.

In one exemplary embodiment of the present invention, a system for managing genealogy data is provided. The system includes a genealogy application for storing genealogy account identification data for a first genealogy account. A social network interface receives data from the first genealogy account and provides genealogical data to the genealogy application. A relative invitation system generates an invitation to a user to create a second genealogy account for the genealogy application.

Those skilled in the art will further appreciate the advantages and superior features of the invention together with other important aspects thereof on reading the detailed description that follows in conjunction with the drawings.

DETAILED DESCRIPTION OF PREFERRED EMBODIMENTS

In the description that follows, like parts are marked throughout the specification and drawings with the same reference numerals, respectively. The drawing figures might not be to scale, and certain components can be shown in generalized or schematic form and identified by commercial designations in the interest of clarity and conciseness.

Figure 1:
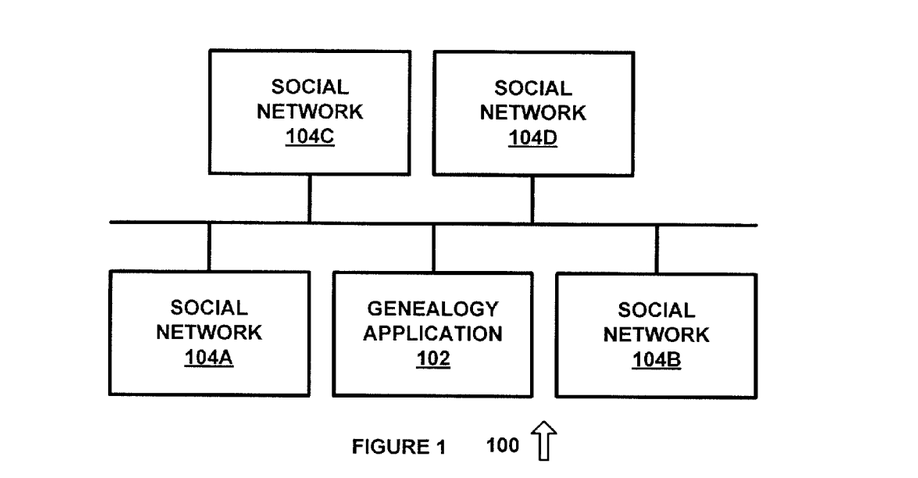
FIG. 1 is a diagram of a system for managing genealogy data in accordance with an exemplary embodiment of the present invention.

FIG. 1 is a diagram of a system 100 for managing genealogy data in accordance with an exemplary embodiment of the present invention. System 100 allows genealogy data to be accessed and managed through social networking websites or applications so as to allow users to identify members of a genealogy family and to coordinate through social networks for genealogical information.

System 100 includes genealogy application 102 and social networks 104a, 104b, 104c, and 104d, each of which can be implemented in hardware, software, or a suitable combination of hardware and software and which can be one or more software systems operating on a general purpose processing platform. As used herein, "hardware" can include a combination of discrete components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications or on two or more processors, or other suitable software structures. In one exemplary embodiment, software can include one or more lines of code or other suitable software structures operating in a general purpose software application, such as an operating system, and one or more lines of code or other suitable software structures operating in a specific purpose software application.

Genealogy application 102 is coupled to social networks 104a through 104d. As used herein, the term "coupled" and its cognate terms such as "couples" or "couple," can include a physical connection (such as a wire, optical fiber, or a telecommunications medium), a virtual connection (such as through randomly assigned memory locations of a data memory device or a hypertext transfer protocol (HTTP) link), a logical connection (such as through one or more semiconductor devices in an integrated circuit), or other suitable connections.

Genealogy application 102 allows a user to organize and coordinate genealogy data using one or more of social networks 104a through 104d as sources for data. In one exemplary embodiment, genealogy application 102 allows the user to set up family trees, identify relatives, provide genealogical data (such as information about a person, audio/video data of a person, or other information that becomes genealogical data by virtue of being associated with a genealogical family structure), access genealogical databases, and perform other genealogical data management functions. Genealogy application 102 also allows the user to coordinate with one or more of social networks 104a through 104d. In one exemplary embodiment, genealogy application 102 can be configured to interface with a single one of social networks 104a through 104d so as to provide data on individuals who have accounts with that specific social network, to provide permission and set permission for access between accounts on that social network, or to perform other suitable functions. Likewise, genealogy application 102 can be used with two or more of social networks 104a through 104d, as further described herein. Thus, while genealogy application 102 can be used with a single social network 104a through 104d, it can also be used to interface with multiple social networks. In this regard, the user account data can include data specific to that user's account, such as the genealogy data and other data besides the genealogy data, such as an account identifier, linkage data, and other suitable data. The genealogy account data includes data specific to the user's genealogy tree, as well as other associated data, such as an account identifier, data identifying individuals that were determined not to be associated with the user's genealogy tree, individuals that are candidates for inclusion in the user's genealogy tree, associated links to data for such individuals, or other suitable data. Relative data can include data for individuals in a user's genealogy tree, such as birth dates, addresses, family relationships, links to other sources of data or accounts, or other suitable data. As such, while there is some overlap in the data that makes up genealogy account data, user account data, and relative data, there can also be additional data in each data set that distinguishes each data set from the other.

Social networks 104a through 104d provide social networking functions, such as the ability to provide and store information about a person, to form relationships with other persons or members of the social network, such as by having a list of contacts, and otherwise allow individuals to update information so that current information on an individual such as an email address, mailing address, telephone number, or other suitable information can be provided. Social networks 104a through 104d can include general population social networking applications, social networking applications for schools, social networks for professional organizations, other specialized social network applications, or other suitable social network applications. Typically, such social networks 104a through 104d are unrelated, and may be commercial competitors with each other, such that interaction between such social networks is limited or nonexistent. Genealogy application 102 thus provides a mechanism for coordination of predetermined classes of data between such social networks for predetermined purposes, so as to allow for controlled interaction between social networks that does not presently exist.

In operation, system 100 allows a user of one or more of social networks 104a through 104d to access a genealogy application 102 so as to manage genealogical data and to coordinate the genealogical data with persons having accounts on social networks 104a through 104d. System 100 thus allows a single genealogy application to be coordinated with different social networks so as to take advantage of genealogical information that may be stored in different social networks 104a through 104d.

Figure 2:
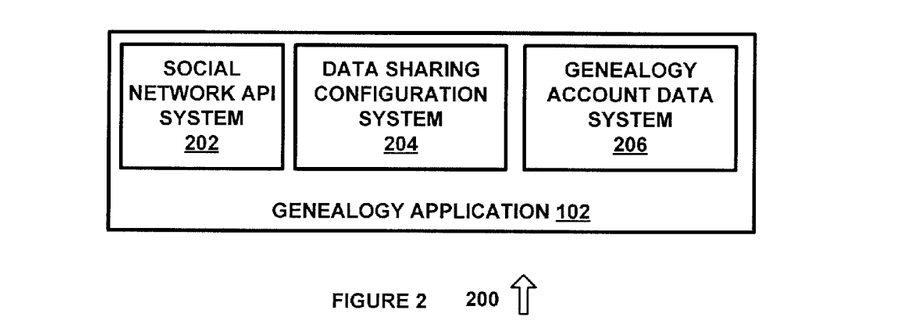
FIG. 2 is a diagram of a system for providing genealogical data management functionality in accordance with an exemplary embodiment of the present invention.

FIG. 2 is a diagram of a system 200 for providing genealogical data management functionality in accordance with an exemplary embodiment of the present invention. System 200 includes genealogy application 102 and social network API system 202, data sharing configuration system 204, and genealogy account data system 206, each of which can be implemented in hardware, software, or a suitable combination of hardware and software and which can be one or more software systems operating on a general purpose processing platform. System 200 can be a centralized application operating as a stand-alone system that interfaces with different social network applications or websites, can be a distributed application operating on different social network applications or websites, or can be configured in other suitable manners.

Social network API system 202 allows data from a social network to be retrieved and allows data to be provided to other social networks, genealogy applications in other social networks, or genealogy application 102. In one exemplary embodiment, a proprietary and confidential application programming interface can be provided for genealogy application 102 or other suitable applications so as to allow genealogy application 102 to interface with a social network and exchange data. Likewise, social network API system 202 can allow a user to identify or select a social network for which an API already exists, to configure an API that will allow the social network to provide data for that user, such as by providing fields for a password, user ID or other suitable data, or to perform other suitable functions.

Data sharing configuration system 204 allows a user to identify what data can be shared with others through genealogy application 102. In one exemplary embodiment, users can store a large amount of data on a social network but can restrict access to such data to certain persons, can restrict classes of data that will be available to genealogy application 102, or can perform other suitable functions. Data sharing configuration system 204 allows a user to identify what data may be provided to users of other social networks, such as where a users' data access configuration controls for a first social network would not be applicable in a second social network, allows a user to identify updating characteristics, such as a period of time or data set for which coordination with different social networks should be allowed, an order of precedence for coordination (e.g., which of two or more social networks should be the "primary" data source), or other suitable data.

Genealogy account data system 206 allows the user to configure and manage a genealogy account. In one exemplary embodiment, genealogy data can include family trees that show relationships between individuals such as mother-father relationships, parent-child relationships, brother-sister relationships, grandfather-grandmother relationships, aunt-uncle relationships, or other suitable relationships. In this manner, genealogy trees can be configured and coordinated, and can be readily adapted to account for and include additional data from other genealogy sources, such as other users of genealogy accounts and users of social network accounts. For example, a link can be provided to a user genealogy account on a social network that allows the contact information for that person to be periodically updated, so as to ensure that the data for individuals in a genealogy tree is kept up to date. Likewise, additional information from a social network can be used to populate the genealogy data, such as where a social network allows users to add data fields for children or other relatives, to change their marital status, or to otherwise change data that can be provided to the genealogy application.

In operation, system 200 allows users to configure and manage a genealogy application so as to interface with one or more different social networks. In this manner, users of different social networks can be coordinated through a genealogy application so as to allow the genealogy data to be supplemented with data from different social networks.

Figure 3:
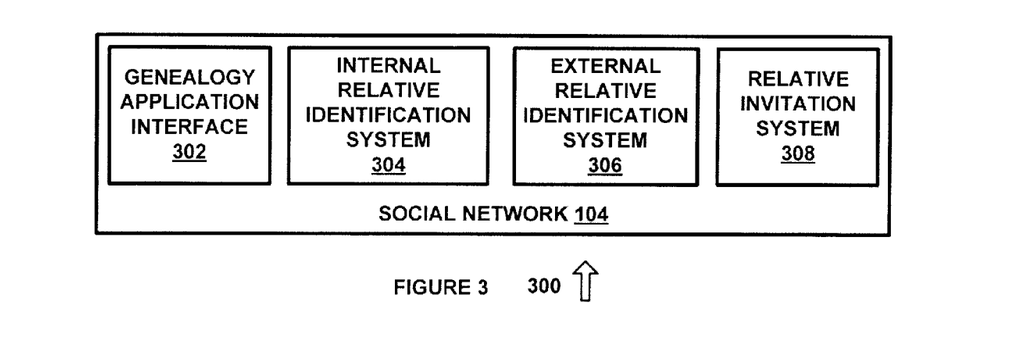
FIG. 3 is a diagram a system for interfacing between a social network and a genealogy application in accordance with an exemplary embodiment of the present invention.

FIG. 3 is a diagram of a system 300 for interfacing between a social network and a genealogy application in accordance with an exemplary embodiment of the present invention. System 300 includes social network 104 and genealogy application interface 302, internal relative identification system 304, external relative identification system 306 and relative invitation system 308, each of which can implemented in hardware, software, or a suitable combination of hardware and software, and which can be one or more software systems operating on a general purpose processing platform.

Genealogy application interface 302 allows a social network to be configured to provide data to and receive data from a genealogy application. In one exemplary embodiment, genealogy application interface 302 can be used to interface between genealogy applications within the social networks, such as where a distributed genealogy application architecture is used instead of a centralized genealogy application architecture. Likewise, genealogy application interface 302 can be used to interface with an external genealogy application or other suitable applications.

Internal relative identification system 304 allows a user to locate a relative using genealogical data and user data of a social network. In one exemplary embodiment, a user of genealogy application 102 can access a database of users of a social network and can locate a relative or potential relative using account data stored on the social network user database, such as data that identifies where an account holder of the social network was born, has resided or presently resides, relatives of the account holder, or other suitable data. In another exemplary embodiment, genealogical data stored on the social network user database can be utilized, such as where the social network includes a distributed genealogy application. The social network can have a single user database with fields for the genealogy application, a separate database for the genealogy application, or other suitable configurations.

External relative identification system 306 allows a user to locate a relative using genealogical data from sources other than a social network. In one exemplary embodiment, a user of genealogy application 102 can access a database of genealogy data and can locate a relative or potential relative using data stored on the database, such as data that identifies where a person was born, has resided or presently resides, relatives of the person, or other suitable data. In another exemplary embodiment, external relative identification system 306 can search social network user databases using genealogical data from sources other than a social network, such as to confirm whether a person associated with the genealogical data has an account on the social network.

Relative invitation system 308 allows a user to invite an identified relative for inclusion in genealogy data, to invite such relatives to join a social network, and to perform other suitable functions. Incentives can also be provided, such as where a relative can be invited to join one of several social networks that interface with the genealogy application, and where the operator of the genealogy application receives an incentive to promote one of the social networks. The relative can also be given the option of setting controls on the data that is to be provided to the genealogy application, to decline the invitation, to decline and request or provide additional data, or to perform other suitable functions.

In operation, system 300 allows social networks to be configured to interface with a centralized genealogy application, to allow a distributed genealogy application to coordinate data, or for other suitable purposes. System 300 allows relatives to be located and invited to join the genealogy application, a social network, or other suitable applications so as to allow the relative to provide additional data for use by the genealogy application.

Figure 4:
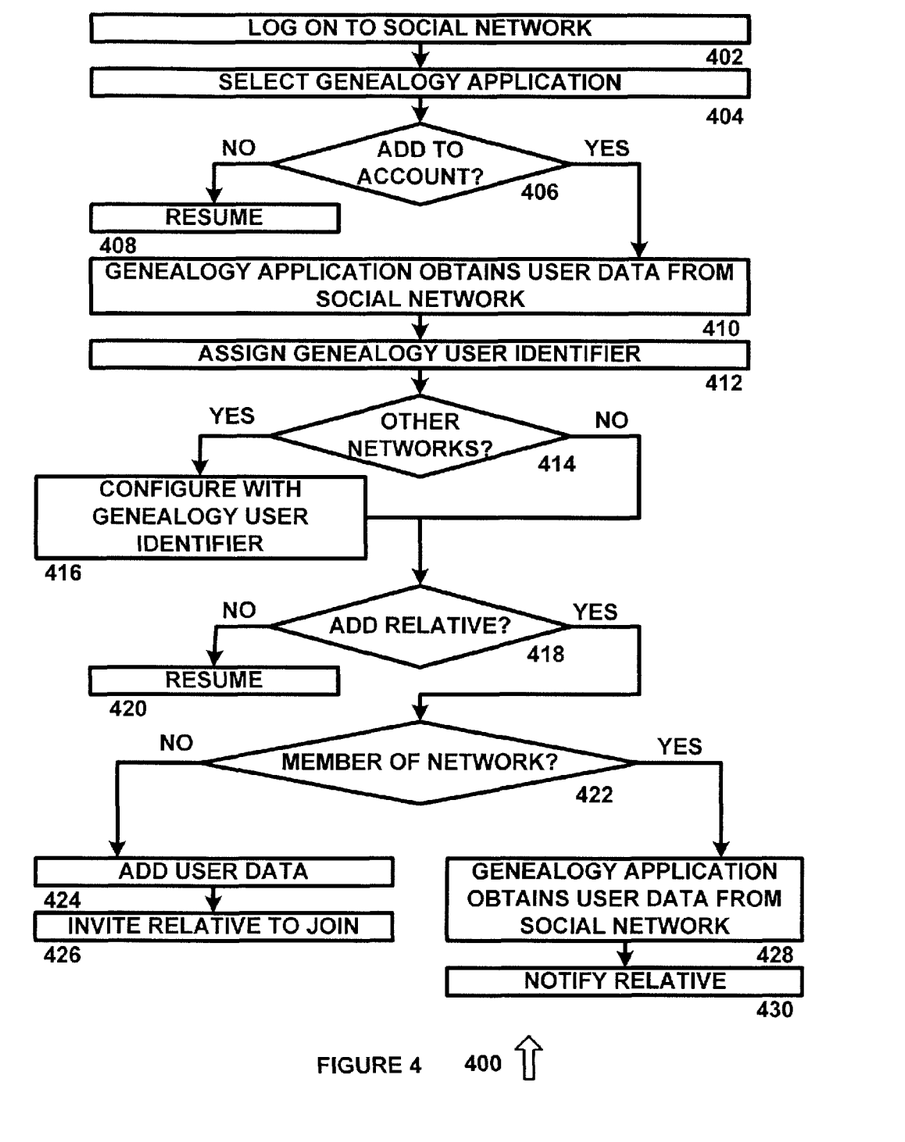
FIG. 4 is a diagram of a method for allowing a genealogy application to be coordinated to a social network in accordance with an exemplary embodiment of the present invention.

FIG. 4 is a diagram of a method 400 for allowing a genealogy application to be coordinated to a social network in accordance with an exemplary embodiment of the present invention. Method 400 begins at 402 where a user logs on to a social network. In one exemplary embodiment, the user may log on to a social network that the user has an account on, the user can start a new account on a social network, or other suitable processes can be performed. The method then proceeds to 404.

At 404, a user selects the genealogy application, such as by selecting from available applications on the social network, by requesting access (such as where the genealogy application is not publicly displayed or is selected using a hyperlink provided in an invitation), or in other suitable manners. The method then proceeds to 406.

At 406, it is determined whether the genealogy application should be added to the user's account. If it is determined that the user has not selected to have the genealogy application added to their account, the method proceeds to 408 and resumes the previous operation or terminates. Otherwise the method proceeds to 410 where the genealogy application obtains user data from the social network. In one exemplary embodiment, the genealogy application can be a centralized genealogy application, such that the genealogy application accesses the social network through an API. In another exemplary embodiment, the genealogy application can be hosted on the social network, such that the social network information is received from or provided to the social network, from one or more other social networks through an API between genealogy applications on those social networks, or in other suitable manners. Any suitable configuration of APIs can be used, such as an API of a genealogy application that resides within a single social network that is between the social network and the genealogy application, an API between that social network and another social network that is used to coordinate data for genealogy applications on the different social networks, an API between genealogy applications on different social networks that is independent of the different social networks, or other suitable configurations. The method then proceeds to 412.

At 412, the user is assigned a user identifier. In one exemplary embodiment, a unique user identifier can be used so as to allow the user to coordinate genealogy information for genealogy applications operating on other social networks, to allow different social networks to interact with a centralized genealogy application, or in other suitable manners. The method then proceeds to 414.

At 414, it is determined whether other social networks are to be selected, such as where the genealogy application can interface with other social networks. If it is determined that other social networks are not to be selected, or if the genealogy application only interfaces with a single social network, the method proceeds to 418, otherwise the method proceeds to 416 where one or more selected social networks are configured with the genealogy user identifier. In one exemplary embodiment, a user can access social networks from a centralized genealogy application, such where the user has a number of social network accounts and uses a genealogy application identifier to quickly configure those accounts with genealogy data. Likewise, other suitable processes can be used. The method then proceeds to 418.

At 418, it is determined whether a relative should be added. If it is determined a relative should not be added then the method proceeds to 420 where the user resumes other operations. Otherwise the method proceeds to 422.

At 422, it is determined whether the relative to be added is a member of the social network. If it is determined that the relative is not a member of the social network, then the method proceeds to 424 and the user adds user data, such as to allow the relative to be contacted. The method then proceeds to 426 where the relative is invited to join, such as by sending an email or in other suitable manners.

Likewise, if it is determined that at 422 the new relative is a member of the social network then the method proceeds to 428 where the genealogy application obtains the user data from the social network. In one exemplary embodiment, the genealogy application can determine whether controls have been implemented to limit the type of data that can be accessed, and a request to change the access control settings can be generated. The method then proceeds to 430.

At 430, the relative is notified that they have been added to the genealogy application. For example, if the relative has set controls on the amount or type of data that can be provided to other applications, the request can be made to allow the relative to provide additional data or other suitable processes can be used.

In operation, method 400 allows the user to configure a genealogy account so as to allow the data stored in social networks to be used to coordinate genealogy functions. In this manner, a user can access various social networks and leverage data collected by social networks in a centralized or distributed genealogical application.

Figure 5:
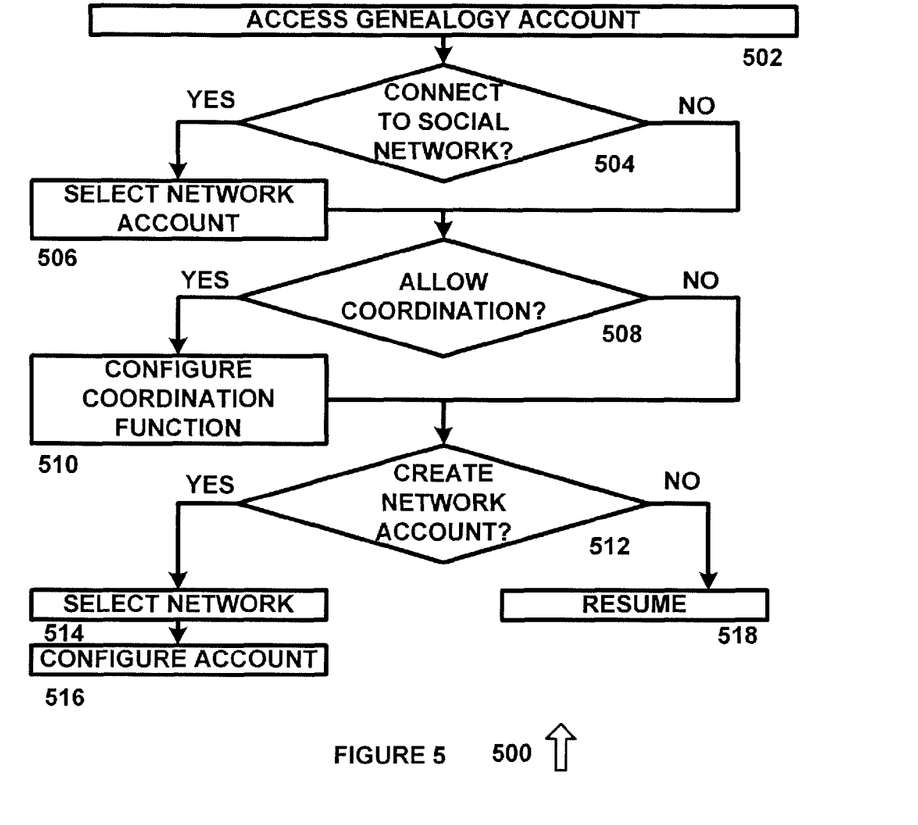
FIG. 5 is a diagram of a method for configuring a genealogy account in accordance with an exemplary embodiment of the present invention.

FIG. 5 is a diagram of a method 500 for configuring a genealogy account in accordance with an exemplary embodiment of the present invention. Method 500 begins at 502 where a genealogy account is accessed. In one exemplary embodiment, a user can access a genealogy account from a central genealogy server, from a genealogy application operating within one of a plurality of social networks, or in other suitable manners. The method then proceeds to 504.

At 504, it is determined whether to connect to a social network, such as where a user can elect to access a social network from a centralized genealogy application, where a user can elect to change from a first social network having a genealogy application to a second social network having a genealogy application, or to perform other suitable functions. If it is determined that connection to a social network is not required the method proceeds to 508, otherwise the method proceeds to 506 where a network account is selected and the connection is performed. The method then proceeds to 508.

At 508, it is to determined whether to allow coordination of genealogical information and social network information. If it is determined that coordination is not required, the method proceeds to 512, otherwise the method proceeds to 510 for the coordination function that has been configured. In one exemplary embodiment, a user can select controls for allowing coordination of data between social networks, between genealogical applications in social networks, or other suitable controls. The method then proceeds to 512.

At 512, it is determined whether to create a new network account. If it is determined that no new network account is to be created, then the method proceeds to 518 and the user resumes standard operations. Otherwise, the method proceeds to 514 where a social network is selected and the method proceeds to 516 where the new social network account is configured. A user can also or alternatively create a new network account before allowing coordination, or other suitable processes can also or alternatively be used.

In operation, method 500 allows a user to configure a genealogy application so as to allow genealogical data to be shared between social networks. Method 500 allows efficient management of genealogical data that may be available in different social networks, and provides for individual user control of account settings.

Figure 6:
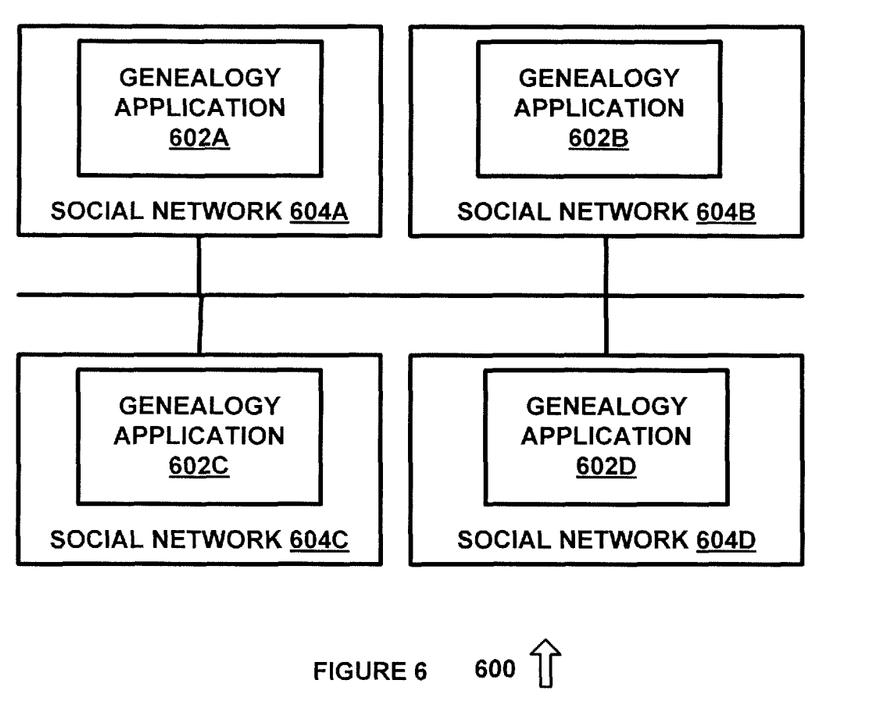
FIG. 6 is a diagram of a system for providing a distributed genealogy application within different social networks in accordance with an exemplary embodiment of the present invention.

FIG. 6 is a diagram of a system 600 for providing a distributed genealogy application within different social networks in accordance with an exemplary embodiment of the present invention. System 600 includes genealogy applications 602a through 602d and social networks 604a through 604d. Genealogy applications 602a through 602d coordinate and manage data through periodic updates and sharing of data, and can be provided with rules for determining priority and conflict resolution. In one exemplary embodiment, priority can be assigned to one of genealogy applications 602a through 602d, such as where one of the genealogy applications is designated as a master or primary and the other genealogy applications are designated as secondary. Likewise, priority can be assigned to one of social networks 604a through 604d, such as where one of the social networks is designated as a master or primary and the other social networks are designated as secondary. Another updating process can be continuous, such as where the genealogy application within a social network or a centralized genealogy application that is updated transfers changes to all other genealogy applications or the centralized genealogy application. In this manner, any changes are reflected globally as they are made.

The designation of primary and secondary can be configured by individual accounts, such as to allow a user to designate a genealogy application operating on one social network as the primary genealogy application for management and data sharing, but where the user can designate one social network as a primary social network for obtaining additional genealogy data or identifying additional relatives. Likewise, the designation of primary and secondary genealogy applications and social networks can be performed as a function of the overall system architecture.

For example, a user may elect to have the genealogy application on a social network that is dedicated to certain groups of professionals, a student organization or other suitable social networks designated as the primary genealogy application, such as where that social network is the social network that is primarily accessed by the user. However, another social network that is available to the general public may provide a better source for identifying relatives for addition to the user's genealogy data. In this exemplary embodiment, the user can configure the secondary genealogy applications on the other social networks to provide data to the primary genealogy application on the secondary social network, but the user can also designate the primary social network to be the social network to which non-network relatives are invited to join, so as to provide an incentive for relatives to join the primary social network and in so doing, potentially identify additional relatives.

In another exemplary embodiment, the genealogy application service provider may have an agreement with one of the social networks to send invitations for non-network relatives to join that social network as a default social network. In this exemplary embodiment, the genealogy application service provider may configure the genealogy application on that social network to be the primary application. Other suitable configurations can also or alternatively be provided.

In operation, system 600 allows a genealogy application to be distributed in different social networks and provides for coordination of data gathered at each social network between genealogy applications. System 600 allows users or system operators to configure the types of data and synchronization processes that will be used to coordinate that data in a distributed architecture.

Figure 7:
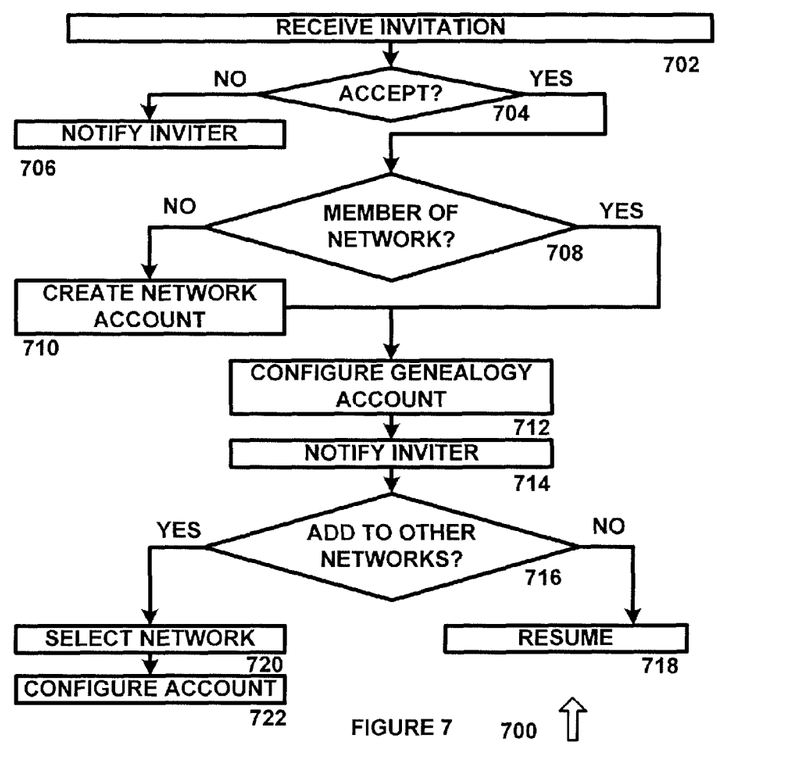
FIG. 7 is a diagram of a method for inviting a relative to join a social network in accordance with an exemplary embodiment of the present invention.

FIG. 7 is a diagram of a method 700 for inviting a relative to join a social network in accordance with an exemplary embodiment of the present invention. Method 700 begins at 702 where a user receives an invitation, such as an email or other message notifying the user that they have been asked to join a genealogy application, a social network and genealogy application, or other suitable invitations. The method then proceeds to 704 where it is determined whether the user has accepted. If an acceptance has not been received the method proceeds to 706 where the inviter is notified that the user has either declined or not received the invitation. Otherwise the method proceeds to 708.

At 708, it is determined whether the user is a member of the social network. If the user is a member of the social network, the method proceeds to 712, otherwise the method proceeds to 710 where the user creates a new account on the social network. The method then proceeds to 712.

At 712, the genealogy account is configured, such as to allow the genealogy account to be populated with genealogy data, personal data, social network links, and other suitable data. The method then proceeds to 714.

At 714, the inviter is notified that the invited user has joined the social network and the invited user's genealogy data is then coordinated with the genealogy account data of the inviter. The method then proceeds to 716 where it is determined whether or not to add links to accounts on other social networks. If it is determined at 716 that links to accounts on other social networks are not required, the method proceeds to 718 and resumes other operation. Otherwise the method proceeds to 720 where a social network is selected. The method then proceeds to 722 where the account is configured, such as by allowing the new user to provide a user id, password, a genealogy user identifier, access permissions or other suitable data. In another exemplary embodiment, a user's social network account can be configured by using the social network's API to obtain the user's unique session key, such that the social network's API can be used to identify the user.

In operation, method 700 allows a user to be invited to join a genealogy application and to create a new social network account for use with the genealogy application, to add existing social network accounts for use with the genealogy application, to configure the types of data that will be provided to the genealogy application, and to perform other management functions. Method 700 can be used in a genealogy application that is centralized, distributed or in other suitable architectures.

Figure 8:
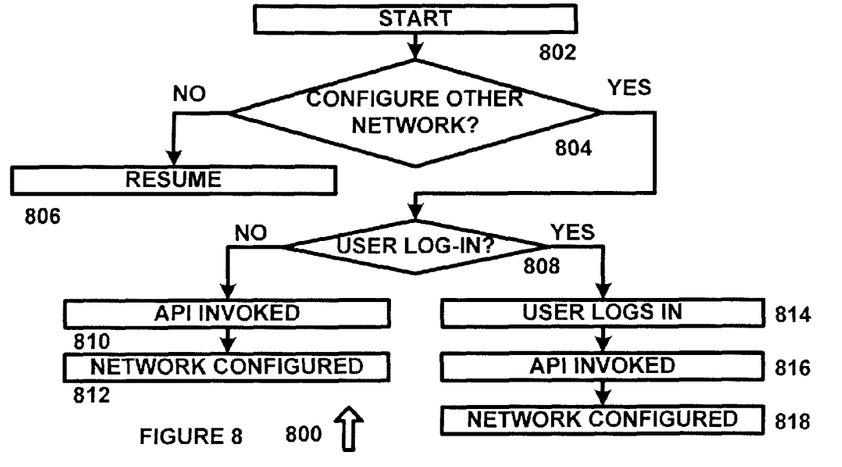
FIG. 8 is a flowchart of a method for allowing a user to coordinate social networks in accordance with an exemplary embodiment of the present invention.

FIG. 8 is a flowchart of a method 800 for allowing a user to coordinate social networks in accordance with an exemplary embodiment of the present invention. Method 800 begins at 802 and proceeds to 804 where it is determined whether or not to configure another social network. If it is determined not to configure another social network, the method proceeds to 806 and resumes other operations. Otherwise the method proceeds to 808 where it is determined whether a user should log in or if user log-in is not required.

If it is determined at 808 that user log-in is not required, then the method proceeds to 810 where an application programming interface is invoked. In one exemplary embodiment, the application programming interface can be used to transfer data in accordance with predetermined or user-configurable data transfer provisions. In another exemplary embodiment, the application program interface can be configured, such as to interface with a new social network. The method then proceeds to 812 where the social network is configured to interface with the genealogy application, such as by applying user-selected or predetermined data coordination controls.

Likewise, if it is determined user log-in is required, the method proceeds to 814 where the user logs in and then proceeds to 816 where an application program interface is invoked, if one is present. The method then proceeds to 818 where the network is configured, such as by allowing the user to configure user-selectable controls for coordination of data, by allowing the user to provide data that is not provided through an application program interface, or in other suitable manners.

In operation, method 800 allows a user to configure multiple social networks to interact with a genealogy account, such as a centralized genealogy account, a genealogy account that is distributed on the different social networks, or other suitable configurations. In this manner, the social networks and data fields in social networks that are used to coordinate with a genealogy application can be configured by a user, a system operator, or other suitable persons.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the claimed subject matter is to be determined by the broadest permissible interpretation of the following claims and their equivalents, and shall not be restricted or limited by the foregoing detailed description.

What is claimed is:

1. A system for managing genealogy data comprising:
    a genealogy application operating on a processor and operable to store genealogy account identification data for a first genealogy account;
    a social network interface operating on a processor and operable to receive data from the first genealogy account and to provide data from the social network to the genealogy application; and
    a relative invitation system operating on a processor and operable to identify a genealogical relative from the social network data without input from a user, to present the genealogical relative to the user for approval to be invited to form an association with a genealogical data structure, and to generate an invitation to the genealogical relative to allow the genealogical relative to be automatically added to the genealogical data structure.

2. The system of claim 1 wherein the relative invitation system is operable to receive a response from the genealogical relative and to associate a second genealogy account with the first genealogy account.

3. The system of claim 1 further comprising a data sharing configuration system operating on a processor and operable to automatically determine which of first genealogical data and second genealogical data should take priority if there is a conflict between the first genealogical data and the second genealogical data.

4. The system of claim 1 wherein the social network interface comprises a genealogy application interface for interfacing with a centralized genealogy application.

5. The system of claim 1 wherein the social network interface comprises a social network application program interface for interfacing with an external social network.

6. The system of claim 1 wherein the social network interface comprises a social network application program interface for interfacing with internal social network data.

7. The system of claim 1 further comprising an internal relative identification system operating on a processor and operable to identify a user of a social network based on the genealogical data.

8. The system of claim 1 further comprising an external relative identification system operating on a processor and operable to identify a non-user of a social network based on the genealogical data and to generate an invitation to the non-user of the social network.

9. The system of claim 1 further comprising a second social network interface for receiving data from the first genealogy account and providing second genealogical data to the genealogy application.

10. A method for managing genealogy data comprising:
creating a genealogy account for a user with a processor;
associating genealogical data for the genealogy account with the processor;
electronically receiving relative data from a first social network, including access restriction data;
automatically identifying a person associated with the relative data if the person has not restricted access with the processor;
electronically transmitting an invitation to the person;
receiving an acceptance of the invitation from the person associated with the relative data with the processor; and
automatically associating the relative data from the first social network with the genealogy account with the processor and without approval from the user.

11. The method of claim 10 wherein creating the genealogy account for the user comprises creating the genealogy account for the user as part of a social network account.

12. The method of claim 10 wherein creating the genealogy account for the user comprises creating the genealogy account for the user independent of a social network account.

13. The method of claim 10 wherein receiving the relative data from the first social network comprises receiving the relative data through an application program interface between a genealogy application and the first social network.

14. The method of claim 10 wherein receiving the relative data from the first social network comprises receiving the relative data directly from a database of the first social network.

15. The method of claim 10 further comprising generating an invitation for a relative to create a genealogy account.

16. The method of claim 10 wherein automatically associating the relative data from the first social network with the genealogy account without approval from the user further comprises automatically adding genealogy data from an account associated with the person to the user's genealogy account.

\* \* \* \* \*